July 17, 1923.   1,461,916

A. KREHLIK

ADJUSTING MECHANISM FOR TRANSMISSION BANDS

Filed Oct. 4, 1922

Inventor
Albert Krehlik

By
Ted L. Billman
Attorney

Patented July 17, 1923.

1,461,916

UNITED STATES PATENT OFFICE.

ALBERT KŘEHLIK, OF CLEVELAND, OHIO.

ADJUSTING MECHANISM FOR TRANSMISSION BANDS.

Application filed October 4, 1922. Serial No. 592,195.

*To all whom it may concern:*

Be it known that I, ALBERT KŘEHLIK, a citizen of the United States, residing at Cleveland, in the county of Cuyahoga and State of Ohio, have invented certain new and useful Improvements in Adjusting Mechanism for Transmission Bands, of which the following is a specification.

My invention relates to improvements in adjusting mechanism for transmission bands used in connection with planetary transmission mechanism, such for example,—as used in connection with Ford automobiles.

The invention relates more particularly to an improved auxiliary or supplemental element adapted to be interposed between the split transmission band and the companion or cooperating drum when the lining of such band has become worn to such an extent as not to effectively grip and stop the motion of the drum which supports the gears. In the present instance, the supplemental element is in the specific form of a friction or wear block provided at one side with flanges spaced apart to receive the split band and provided with a suitable friction surface on the other to engage with the co-operating drum whereby the split portions of the clamping band are held further apart and the band as a whole more effectively grips the cooperating drum.

The primary object of the invention is to provide a simple, cheap and efficient block or element which may be readily inserted in or removed from any clamping band without disassembling or disarranging the parts, the improved device being particularly adapted for use as an emergency device.

With the above mentioned and other ends in view, the invention consists in the novel construction, arrangement and combination of parts, hereinafter described, illustrated in some of its embodiments in the accompanying drawings, and particularly pointed out in the appended claims.

Figure 1:
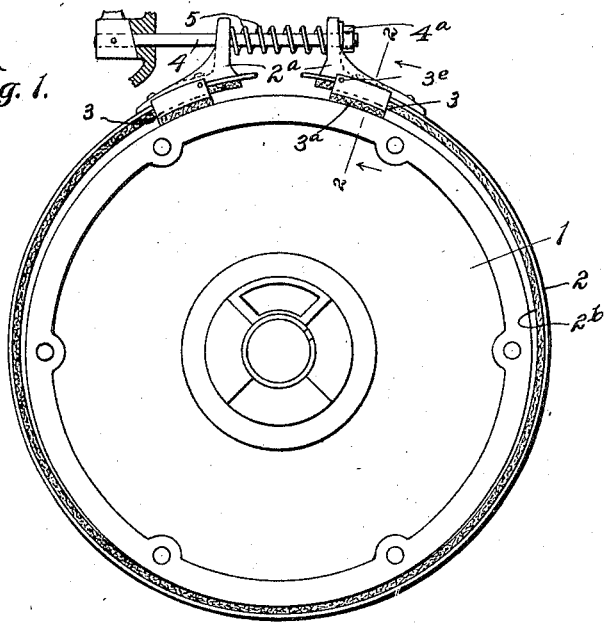

Referring to the drawings, forming a part of this specification, Figure 1 is a side elevation of a drum and split band of an ordinary planetary transmission of the Ford type equipped with a pair of band adjusting elements or supplemental wear blocks mounted and constructed in accordance with this invention.

Figure 2:
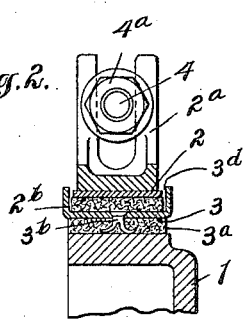

Fig. 2, an enlarged cross sectional view of the same taken on line 2—2 of Fig. 1.

Figure 3:
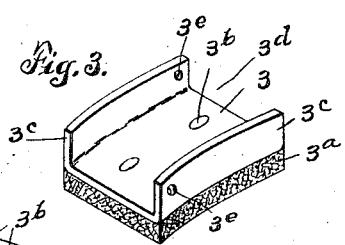

Fig. 3, a perspective view of one of the adjusting elements or blocks, removed.

Figure 4:
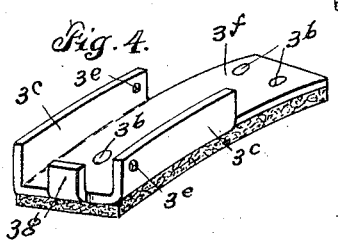

Fig. 4, a perspective view of a modified form of band adjusting element or block.

Similar numerals of reference designate like parts throughout all the figures of the drawings.

In the drawings I have shown in Figs. 1 and 2 a drum 1, and a split band 2, of an ordinary Ford type planetary transmission equipped in Fig. 1 with a pair of band adjusting elements or blocks 3, constructed in accordance with this invention, but it should be understood that under ordinary circumstances a single adjusting element or block inserted from the split end of the band will be sufficient to carry out the purposes of this invention. As shown, the split ends of the band are provided with the usual lugs $2^a$, provided with openings carrying the usual pedal actuated shaft 4, and adjusting nut $4^a$. A spring 5, serves to normally expand the respective split ends of the band 2. As is well known, each band is lined with a suitable lining member $2^b$, of suitable friction material and the lining $2^b$ may be removably secured by means of attaching elements or rivets in the usual conventional and well known manner, so that the lining may be readily removed therefrom and renewed as required. In view of the fact that the throw between the relatively movable part of the band and the pedal actuated shaft is limited by the relative thickness of the lining member $2^b$ and the effective action of the cooperating cam surfaces, it follows that when the lining member $2^b$ becomes substantially worn the throw or clamping action imparted to the split band may be such as not to effectively grip and stop the drum 1.

As a means of compensating for such wear and increasing the clamping action of the band,—particularly in an emergency and until the lining $2^b$ may be renewed, one or more band adjusting elements or blocks 3, may be inserted through the split portions of the band or bands (as the case may be) as illustrated in Figs. 1 and 2 of the drawings.

The band adjusting element or supplemental wear block 3, is preferably of flanged formation on one side and is preferably provided on its other or inner side with a friction element or lining element $3^a$, the latter being secured, in the present instance, by means of attaching elements in the specific form of split rivet members 3$^b$. The band adjusting element or wear block is preferably made up of flanges 3$^c$, spaced apart to correspond with the width of the band 2 so as to readily receive the latter when inserted, such flanges forming a channel portion 3$^d$, within which the band is seated when the parts are in proper position. As a means of readily inserting and removing the blocks or elements 3, and particularly as a means of guarding against any liability of such elements falling between the parts of the gearing mechanism, the flanges 3$^c$ may be provided with openings 3$^e$, to removably receive and attach small wires or cords for use while the inserting or removing operation is being performed.

Referring to the modified form shown in Fig. 4, it will be seen that the main body portion is elongated or extended by means of an extension 3$^f$, of tapered or wedge shaped formation and it will also be seen that the rear portion is provided with a rear or base flange 3$^g$, to form an abutment to engage and interlock with the adjacent split end of the band when inserted, thus holding the elements in a relatively fixed position with respect to the band.

Having thus described some of the embodiments of my invention, without having attempted to set forth all the forms in which it may be made, or all the modes of its use, what I claim and desire to secure by Letters Patent, is—

1. An adjusting device for a split transmission band, comprising a flanged block adapted to be seated beneath and held within said band whereby the effective clamping action of the latter is increased.

2. In combination with a transmission drum and a surrounding split band, a member adapted to be removably interposed between the latter and said drum and provided with means for retaining said interposed member in seated position.

3. An emergency device for planetary transmission split bands, comprising a flanged block provided with a wear surface adapted to engage the surrounded drum and to be inserted between the latter and said band from the split portion of the latter.

4. An adjusting block for split transmission bands provided on one side with a channel to receive the adjacent split portion of the band and with abutments to interlock with the latter and on the other with a friction portion to engage with the cooperating drum.

5. In combination with a split transmission band, a cooperating drum, and means for expanding and contracting said band; of a removable block interposed between said drum and band and provided with means for retaining the same in position upon relative movement between said drum and band.

6. An emergency device for split bands of planetary transmission mechanism, comprising a flanged supplemental block provided with a removable wear member adapted to engage the surrounded drum, said block being insertable and removable from between said drum and band from the split portion of the latter.

7. In combination with a split transmission band and a cooperating drum, a wear block provided at one side with flanges spaced apart to receive the edges of the split band and provided with a friction surface on the other side to engage said drum, said block being insertable in and removable from said band from the split portion of the latter.

8. In combination with a transmission drum and a surrounding split band, a wear block provided on one side with flanges adapted to receive and engage with the sides of said split band and at the other with a friction element to engage with said drum, said element being insertable in and removable from said band through the split portion of the latter.

9. In combination with a planetary transmission drum and a split band, a wear block provided with flanged abutments to receive and interlock with the adjacent marginal portions of said split band and provided with a friction surface to engage said drum, said block being insertable in and removable from said band from the split portion of the latter.

In testimony whereof I have affixed my signature.

ALBERT KREHLIK.